Dec. 29, 1959
E. EGGER
2,919,095
VIBRATION DAMPENING BRACKET FOR MOUNTING
A ROTATING BEACON LIGHT ON A MOTORCYCLE
Filed June 21, 1957
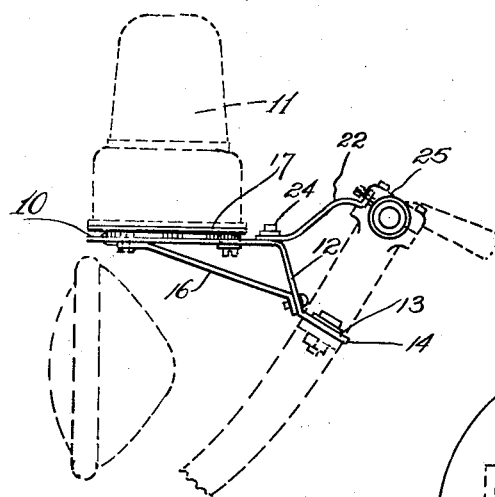
Fig 1.
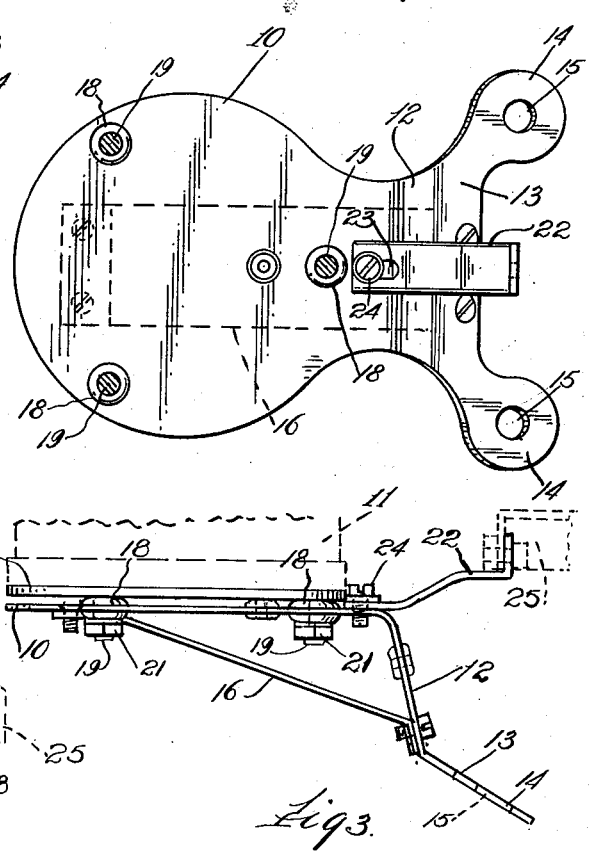
Fig 2.
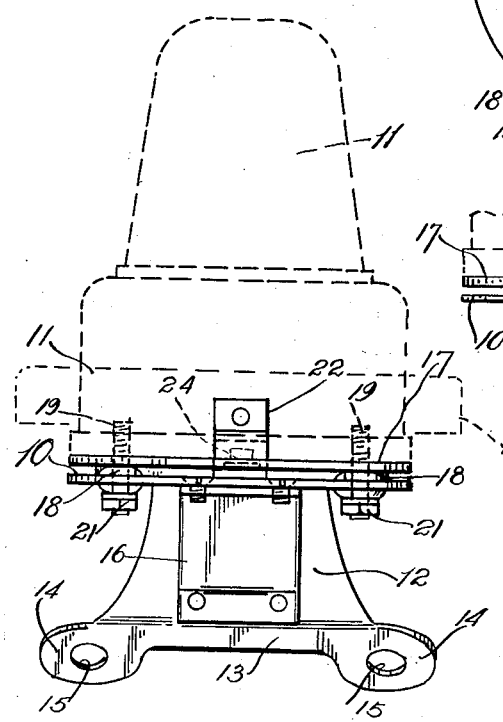
Fig 3.
Fig. 4.
INVENTOR.
Ernest Egger.
BY
James R. McKnight
Attorney.

United States Patent Office 2,919,095
Patented Dec. 29, 1959

2,919,095

VIBRATION DAMPENING BRACKET FOR MOUNTING A ROTATING BEACON LIGHT ON A MOTORCYCLE

Ernest Egger, Joliet, Ill.

Application June 21, 1957, Serial No. 667,255

1 Claim. (Cl. 248—204)

The present invention relates to a bracket which will rigidly hold a rotating beacon light on a motorcycle and successfully maintain it there in operating condition.

Rotating flashing beacon lights have been installed by magnets or toggle bolts on the tops of automobiles used in emergency work such as the squad cars of the law enforcement agencies, fire flighting departments, ambulances and the like. In many communities, work of this kind is done or supplemented by motorcycles. It is of course apparent that there is no flat top roof on a motorcycle as on an automobile to support such a light. There is very little space for attaching such a light to a motorcycle and it must be mounted where it can be of maximum use, and value. In addition there is considerably more vibration in a motorcycle than in a car so that it is necessary to plan a support which will not only permit attachment of the light, but maintain the light in normal operating condition over a period of time in spite of this vibration. Without proper support the lens and glass of the light would be shattered by the vibration and make it useless and valueless. It is among the objects of this invention to solve the foregoing problems and to provide a bracket rigidly to support a rotating beacon light on a motorcycle, and to maintain it securely from jarring loose and falling off and safe from shattering the lens or glass therein.

My invention also comprises such other objects, advantages and capabilities as will later more fully appear, and which are inherently possessed by my invention.

While I have shown in the accompanying drawings a preferred embodiment of my invention, yet it is to be understood that the same is susceptible of modification and change without departing from the spirit of my invention.

Referring to the drawings, Fig. 1 is a side elevational view showing my bracket attached to a motorcycle and mounting a rotating beacon light; Fig. 2 is an enlarged top plan view of my bracket; Fig. 3 is a side elevational view; and Fig. 4 is a front elevational view of the same.

The embodiment selected to illustrate my invention comprises a flat platform 10 which is rounded to conform to the bottom contour of the rotating beacon light 11. At the rear portion of the platform a diagonal portion 12 extends downwardly and rearwardly and has at its lower end a flared portion 13 with a pair of spaced rounded extensions 14, each with an opening 15 therethrough.

A reinforcing member 16 is attached to the undersurface of the platform adjacent its front portion and extends rearwardly to diagonal portion 12 to which it is attached by suitable screws or other attaching means.

Light 11 when used with my bracket, is provided with a bottom 17 attached to the light. This bottom rests on grommets 18 which are provided in platform 10. Light 11 is held to platform 10 by means of bolts 19 extending through the grommets or rubber surrounded shock openings 18 in the bottom 17 of platform 10 by retaining nuts 21.

The bottom, and the platform may have suitable openings for wires to pass therethrough leading to the battery of the motorcycle and a suitable ground.

A stabilizer link 22 has a slot 23 at its front portion and is attached to the rear of said platform 10 by a screw 24 extending through said slot with its head against said link. The link extends rearwardly and slightly upwardly to a handle bar riser cap 25 of the motorcycle.

My bracket is attached to the handle bar and fork bracket of the motorcycle with the flared portion 13 bearing against the top of the fork between the handle bar risers. A bolt extends through each opening 15, the risers and the fork bracket and is held by a shakeproof nut. The handle bar riser cap 25 is attached to the top of the handle bars of the motorcycle by suitable attaching means such as stud bolts.

The rotating beacon light is positioned immediately above the headlight and slightly behind it and is positioned in a place of maximum operating efficiency.

Having thus described my invention, I claim:

A bracket for mounting a rotating beacon light on a motorcycle having a handle bar and fork bracket and a handle bar riser cap, said bracket comprising a body member having a platform portion, a diagonal portion extending downwardly and reardwardly from said platform portion, and a flared end portion extending from said diagonal portion and having a pair of spaced rounded extensions with openings therethrough, a reinforcing member attached to and extending between the front undersurface of said platform and the lower end of said diagonal portion, a stabilizer link having a slot in its front portion, a screw having a shank and a head, with the shank attached to and extending through the rear of said platform and the slot in said link, and the head of the screw bearing against said link for adjustable attachment of said link to said platform, said link extending rearwardly and upwardly and adapted to be attached to the handle bar riser cap of the motorcycle, said flared end portion adapted to bear against the handle bar and fork bracket of the motorcycle, and attaching means extending through the opening in said spaced rounded extensions, said platform having spaced rubber grommets, said platform shaped to receive and seat the bottom portion of the rotating beacon light, and means extending through some of said grommets for attachment of the rotating beacon light to said platform and at least one of said grommets having an opening therethrough for an electrical conduit leading to an electrical source of power for providing power and light for the rotating beacon light.

References Cited in the file of this patent

UNITED STATES PATENTS

| | | |
|---|---|---|
| 787,757 | Henry | Apr. 18, 1905 |
| 1,714,814 | Plimpton | May 28, 1929 |
| 1,794,600 | Field | Mar. 3, 1931 |
| 1,848,514 | Cunningham | Mar. 8, 1932 |
| 2,137,480 | Dye | Nov. 22, 1938 |
| 2,367,449 | Triplett | Jan. 16, 1945 |